April 8, 1952 N. B. SAUNDERS 2,592,193
MEANS FOR REDUCING AMPLITUDE DISTORTION
IN CATHODE-FOLLOWER AMPLIFIERS
Filed March 3, 1949
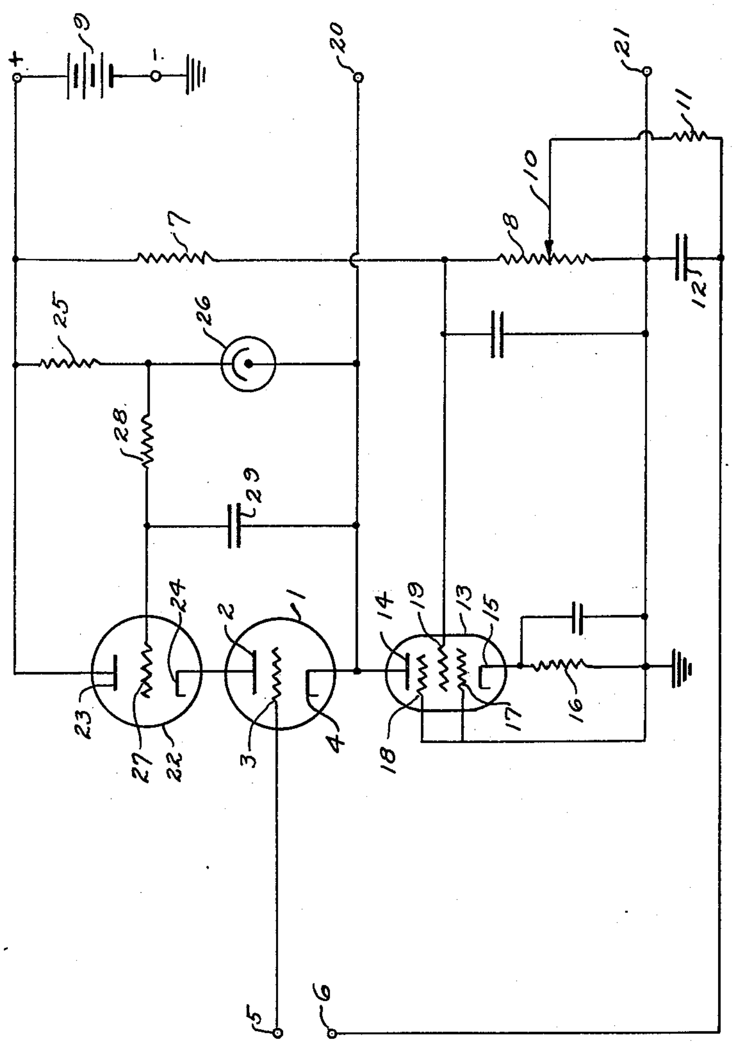
INVENTOR.
NORMAN B. SAUNDERS
BY Wade Koontz AND
ATTORNEY
James S. Shannon
AGENT Patented Apr. 8, 1952 2,592,193

UNITED STATES PATENT OFFICE 2,592,193

MEANS FOR REDUCING AMPLITUDE DISTORTION IN CATHODE-FOLLOWER AMPLIFIERS

Norman B. Saunders, Cambridge, Mass., assignor to the United States of America as represented by the Secretary of War Application March 3, 1949, Serial No. 79,488

4 Claims. (Cl. 179—171)

This invention relates to cathode follower amplifiers and particularly to means for causing the output wave form of such amplifiers to bear a more nearly linear relationship to the input wave form.

In general the term "cathode follower" is applied to amplifiers of the type in which the anode signal voltage is kept at or near ground or other reference potential and in which the load impedance is connected between the control grid and ground. With this arrangement the potential of the cathode tends to follow that of the grid. The signal appearing between the control grid and the cathode is equal to the vector sum of the input signal and the output signal appearing across the load impedance. Since the phase relationship between these two vectors is equal to or near 180 degrees, the input signal must exceed the output signal by an amount sufficient to provide the required signal voltage between grid and cathode. Consequently a cathode follower amplifier has an overall gain less than unity. However, amplifiers of this type have other characteristics which are desirable; among these are low effective input capacity, high input impedance, low output impedance, and a relatively small amount of nonlinear distortion. Because of the high input impedance and low output impedance cathode follower amplifiers are widely used as impedance changing devices.

Although the amount of nonlinear distortion in cathode follower amplifiers is normally low, that present is objectionable in some applications requiring very accurate correspondence between input and output wave forms. It is therefore the object of this invention to improve cathode follower amplifiers by decreasing the amount of nonlinear distortion present sufficiently to permit their use in such applications. This is accomplished in accordance with the invention by providing means to maintain substantially constant either the current through the cathode follower or the anode to cathode voltage, or both. In amplifiers in which both the current and anode to cathode voltage are maintained constant the distortion may be reduced to the point where the error in the output wave form does not exceed one part in ten thousand.

Referring to the figure of the drawing for a specific embodiment of the invention, 1 is an amplifier tube having an anode 2, a grid 3 and a cathode 4. The grid is connected to input terminal 5. The other input terminal 6 is connected through an adjustable source of bias voltage to ground. The adjustable bias source comprises resistors 7 and 8, which are connected between the positive terminals of a source of direct potential 9 and ground, and adjustable contact 10 which may be positioned along resistor 8 to apply an adjustable positive voltage to the input circuit. The resistor 11 and condenser 12 form a filter network to prevent the application to the input circuit of any alternating components that may exist across resistor 8. The bias potential between the grid 3 and the cathode 4 is equal to the algebraic sum of the direct potential drop between cathode 4 and ground and the drop between adjustable contact 10 and ground. By means of contact 10 the bias may be adjusted to the proper operating value for tube 1.

Pentode tube 13 is used to form an impedance between the cathode 4 of tube 1 and ground. This tube has its plate 14 directly connected to the cathode 4 of tube 1, and its cathode 15 connected through biasing resistor 16 to ground. The control grid 17 and the suppressor grid 18 are connected together and to ground. The screen grid 19 is maintained at a constant positive potential above ground by connecting it to a point between resistors 7 and 8. When so connected a pentode tube acts as a constant current device, the anode to cathode current being substantially constant for a wide range of anode voltages. The amplifier output is taken from terminal 20, connected to the cathode 4 of tube 1, and grounded terminal 21.

The tube 22 is connected in series with the anode circuit of tube 1 by connecting the anode 23 directly to the positive terminal of the source of positive potential 9, and the cathode 24 directly to the anode 2 of tube 1. The resistor 25, the gas tube 26, the anode to cathode path of tube 13 and resistor 16 form a series circuit between the positive terminal of source 9 and ground. The grid 27 of tube 22 is connected through resistor 28 to a point between resistor 25 and tube 26 so that the voltage across tube 26 is applied between the grid 27 of tube 22 and the cathode 4 of tube 1. Due to the constant voltage characteristic of tube 26, grid 27 is maintained at a constant positive voltage with respect to cathode 4. In order to insure that this voltage difference remains constant during sudden changes in potential of cathode 4 the condenser 29 is connected between this electrode and grid 27, and the resistance of resistor 28 is made sufficiently high to prevent rapid changes of potential across the condenser.

In operation a signal is applied to input terminals 5 and 6. Due to the impedance between the cathode 4 and ground, formed by the impedance of tube 13 and the impedance of the load connected between terminals 20 and 21, the potential of cathode 4 tends to follow the potential of grid 3. Also the potential variations of cathode 4 are applied to grid 27 of tube 22 since there is a fixed potential difference between these two electrodes. The action of tube 22 is likewise similar to that of a cathode follower due to the impedance between its cathode 27 and ground formed by the anode to cathode impedance of tube 1 and the impedances of the pentode 13 and the load connected between terminals 20 and 21. Therefore the potential variations of cathode 24 tend to follow those of grid 27 which are the same as the potential variations of cathode 4. Since the cathode 24 is directly connected to the anode 2 of tube 1, and since the potential variations of cathode 24 are substantially the same as those of cathode 4 as explained above, the potential difference between anode 2 and cathode 4 remains substantially constant.

I claim:

1. An amplifier comprising an amplifying tube having an anode, a cathode and a control grid, means for connecting a source of input signal between said control grid and a point of reference potential, impedance means connected between said cathode and said point of reference potential, a source of direct current, means connecting the negative terminal of said source to said point of reference potential, means for connecting the positive terminal of said source to said anode, additional means forming part of said last named means for maintaining a substantially constant potential difference between said anode and cathode, said additional means comprising a variable resistance device and means for controlling the resistance thereof in accordance with the potential of said cathode, and means for connecting a load circuit across said impedance means.

2. An amplifier comprising an amplifying tube having an anode, a cathode and a control grid, an impedance connected between said cathode and a point of reference potential, said impedance being of the type in which the current is substantially independent of the voltage over a wide voltage range, a source of direct current, means for connecting the negative terminal of said source to said point of reference potential, means for connecting the positive terminal of said source to said anode, said last named means comprising a variable resistance device, means for controlling said variable resistance device in accordance with the potential of said cathode whereby the potential difference between said anode and said cathode is maintained substantially constant, means for applying an input signal between said control grid and said point of reference potential, and means for connecting an output circuit across said impedance.

3. An amplifier comprising an amplifying tube having an anode, a cathode and a control grid, an impedance connected between said cathode and a point of reference potential, said impedance comprising a pentode tube connected to act as a constant current device, a source of direct current, means connecting the negative terminal of said source to said point of reference potential, a second tube having an anode, a cathode and a control grid, means connecting the anode of said second tube to the positive terminal of said source, means directly connecting the cathode of said second tube to the anode of said amplifying tube, means for maintaining a constant potential difference between the control grid of said second tube and the cathode of said amplifying tube whereby the potential difference between the anode and cathode of said amplifying tube is maintained substantially constant, means for applying an input signal between said control grid and said point of reference potential, and means for connecting an output circuit across said impedance.

4. An amplifier comprising an amplifying tube having an anode, a cathode and a control grid, means for connecting a source of input signal between said control grid and a point of reference potential, impedance means connected between said cathode and said point of reference potential, a source of direct current, means connecting the negative terminal of said source to said point of reference potential, means for connecting the positive terminal of said source to said anode, additional means forming part of said last named means for maintaining a substantially constant potential difference between said anode and cathode, said additional means comprising a second tube having an anode, a cathode and a control grid, with the anode connected to the positive terminal of said source and the cathode directly connected to the anode of said first named amplifying tube, together with means for maintaining a constant potential difference between the cathode of said amplifying tube and the control grid of said second tube, and means for connecting a load circuit across said impedance means.

NORMAN B. SAUNDERS.

REFERENCES CITED

The following references are of record in the file of this patent:

UNITED STATES PATENTS

| Number | Name | Date |
|---|---|---|
| 1,555,301 | Massolle | Sept. 29, 1925 |
| 1,917,015 | Burton | July 4, 1933 |
| 2,269,001 | Blumlein | Jan. 6, 1942 |
| 2,305,919 | Eaton | Dec. 22, 1942 |
| 2,326,614 | Bowman | Aug. 10, 1943 |
| 2,358,428 | White | Sept. 19, 1944 |
| 2,424,893 | Mansford | July 29, 1947 |
| 2,435,579 | Francis | Feb. 10, 1948 |

FOREIGN PATENTS

| Number | Country | Date |
|---|---|---|
| 585,906 | Great Britain | Feb. 28, 1947 |

OTHER REFERENCES

Textbook, Vacuum Tube Amplifiers, Valley and Wallman, Radiation Lab. Series, McGraw-Hill, Publishers, page 432, Figures 11, 16, 1948.